(12) United States Patent
Yoon et al.

(10) Patent No.: US 10,308,751 B2
(45) Date of Patent: Jun. 4, 2019

(54) BLOCK COPOLYMER

(71) Applicant: LG Chem, Ltd., Seoul (KR)

(72) Inventors: Jeong Ae Yoon, Daejeon (KR); Su Jeong Kim, Daejeon (KR); Sung Soo Yoon, Daejeon (KR); Min Ki Lee, Daejeon (KR); Kee Young Kim, Daejeon (KR); Han Na Chi, Daejeon (KR); Sang Hyun Hong, Daejeon (KR); Jeong Sik Bae, Daejeon (KR)

(73) Assignee: LG Chem, Ltd. (KR)

( * ) Notice: Subject to any disclaimer, the term of this patent is extended or adjusted under 35 U.S.C. 154(b) by 185 days.

(21) Appl. No.: 14/915,107

(22) PCT Filed: Sep. 1, 2014

(86) PCT No.: PCT/KR2014/008138
§ 371 (c)(1),
(2) Date: Feb. 26, 2016

(87) PCT Pub. No.: WO2015/030550
PCT Pub. Date: Mar. 5, 2015

(65) Prior Publication Data
US 2016/0208039 A1    Jul. 21, 2016

(30) Foreign Application Priority Data

Aug. 30, 2013  (KR) .......................... 10-2013-0104460
Sep. 1, 2014   (KR) .......................... 10-2014-0115247

(51) Int. Cl.
*C08F 293/00*  (2006.01)
*C08F 220/18*  (2006.01)
(Continued)

(52) U.S. Cl.
CPC .......... *C08F 293/00* (2013.01); *C08F 220/18* (2013.01); *C08F 293/005* (2013.01);
(Continued)

(58) Field of Classification Search
CPC ............... C08F 293/00; C08F 293/005; C08G 18/6225; C08G 18/633; C08J 3/245
See application file for complete search history.

(56) References Cited

U.S. PATENT DOCUMENTS 6,197,883 B1  3/2001  Schimmel et al.
6,989,426 B2  1/2006  Hu et al.
(Continued)

FOREIGN PATENT DOCUMENTS

CN  1620471 A  5/2005
CN  1675281 A  9/2005
(Continued)

OTHER PUBLICATIONS

Werner. Fox Equation. Evidentiary reference. Available at http://www.wernerblank.com/equat/Fox_equation15.htm. (Year: 2010).*
(Continued)

*Primary Examiner* — Michael M Dollinger
(74) *Attorney, Agent, or Firm* — Lerner, David, Littenberg, Krumholz & Mentlik, LLP

(57) ABSTRACT

A block copolymer, a method for preparing a block copolymer, a resin composition, and a film are provided. The block copolymer can be useful in inhibiting complete separation of the hard segment even under a severe high-temperature condition by increasing the chemical cross-linking density around the hard segment without causing an increase in glass transition temperature of the hard segment, thereby maintaining high-temperature durability.

11 Claims, 1 Drawing Sheet

(51) Int. Cl.
*C09D 153/00* (2006.01)
*C09J 153/00* (2006.01)
*C08J 5/18* (2006.01)
*C09J 7/24* (2018.01)

(52) U.S. Cl.
CPC .............. *C08J 5/18* (2013.01); *C09D 153/00* (2013.01); *C09J 7/24* (2018.01); *C09J 153/00* (2013.01); *C09J 153/005* (2013.01); *C08F 2438/01* (2013.01); *C08J 2353/00* (2013.01); *C09J 2201/606* (2013.01); *C09J 2433/006* (2013.01); *C09J 2453/00* (2013.01)

(56) References Cited

U.S. PATENT DOCUMENTS

| | | | |
|---|---|---|---|
| 8,440,214 | B2 | 5/2013 | Arney et al. |
| 2004/0110893 | A1* | 6/2004 | Matyjaszewski ..... C08F 265/04 524/556 |
| 2005/0181148 | A1 | 8/2005 | Kim et al. |
| 2006/0074148 | A1 | 4/2006 | Ahn et al. |
| 2007/0003592 | A1 | 1/2007 | Hissink |
| 2009/0253867 | A1* | 10/2009 | Takahashi ........... C08F 293/005 525/227 |
| 2010/0036022 | A1* | 2/2010 | Sato ........................ C08L 63/00 523/440 |
| 2010/0280182 | A1* | 11/2010 | Balk .................. C08F 293/005 525/217 |
| 2013/0059971 | A1* | 3/2013 | Miller ................ C08F 293/005 524/553 |
| 2013/0183361 | A1* | 7/2013 | Tamareselvy ........ A61K 8/8152 424/401 |
| 2014/0005330 | A1* | 1/2014 | Peleshanko ........ C08G 18/6659 524/591 |

FOREIGN PATENT DOCUMENTS

| | | |
|---|---|---|
| CN | 101466751 A | 6/2009 |
| EP | 1258519 A1 | 11/2002 |
| EP | 2500367 A1 | 9/2012 |
| EP | 3075807 A1 | 10/2016 |
| JP | 2001181591 A | 7/2001 |
| JP | 2006124588 A | 5/2006 |
| JP | 2011184678 A | 9/2011 |
| KR | 20020010693 | 2/2002 |
| KR | 20050076706 A | 7/2005 |
| TW | I274762 B | 3/2007 |
| WO | 2007089435 A2 | 8/2007 |
| WO | 2009126532 A2 | 10/2009 |
| WO | 2011146450 A1 | 11/2011 |

OTHER PUBLICATIONS

Extended Search Report from European Application No. 14841182,0, dated Feb. 24, 2017.
Search Report from Office Action issued in Chinese Application No. 201480054102.X, dated Mar. 1, 2017.
Wu, Tianyu, et al., "RAFT Synthesis of ABA Triblock Copolymers as Ionic Liquid-Containing Electroactive Membranes." ACS Appl. Mater. Interfaces, vol. 4, 2012, pp. 6552-6559.
International Search Report from PCT/KR2014/008138, dated Dec. 8, 2014.
Search Report from Office Action issued in Chinese Application No. 201480054102.X, dated Nov. 6, 2017.

* cited by examiner

BLOCK COPOLYMER

CROSS-REFERENCE TO RELATED APPLICATION

This application is a national phase entry under 35 U.S.C. § 371 of International Application No. PCT/KR2014/008138, filed Sep. 1, 2014 which claims priority to Korean Patent Application No. 10-2013-0104460, filed Aug. 30, 2013 and Korean Patent Application No. 10-2014-0115247, filed Sep. 1, 2014, the disclosures of which are incorporated herein by reference.

BACKGROUND

1. Field of the Invention

The present application relates to a block copolymer, a method for preparing a block copolymer, a curable resin composition, and a film.

2. Discussion of Related Art

Phase separation of blocks occurs when a film is formed by using block copolymers having two or more immiscible blocks. In this case, phases such as spherical structure, gyroidal structure, cylindrical structure, and lamellar structure are exhibited according to the content ratios of the respective blocks.

Particularly, a phase having a spherical structure is a phase in which spherical domains are dispersed in the matrix. Thus, since the spherical domains may serve as physical cross-linking points, such a phase may be used in applied fields requiring thermoplastic properties, for example, technical fields requiring high heat resistance and durability.

SUMMARY OF THE INVENTION

The present application is directed to providing a block copolymer, a method for preparing a block copolymer, a curable resin composition, and a film.

One aspect of the present application provides a block copolymer. The block copolymer includes a hard segment having a glass transition temperature of 25° C. or more, and a soft segment having a glass transition temperature of 10° C. or less and including a polymerization unit derived from a cross-linkable monomer. Here, the polymerization unit derived from the cross-linkable monomer has a higher concentration in a region adjacent to the hard segment than in a region which is not adjacent to the hard segment. Therefore, in the soft segment of the block copolymer, a cross-linkable functional group is present at a high density in the region adjacent to the hard segment. Accordingly, when a phase-separated film is formed by using the block copolymer and cross-linked, a shell layer having a high cross-linking density which is present around the hard segment to surround the hard segment may be formed, thereby preventing a situation in which a phase disappears as the shell layer is completely untangled even at a severe temperature condition higher than the glass transition temperature of the hard segment. Therefore, the film may further ensure durability at a severe high-temperature condition.

According to one exemplary embodiment, the block copolymer according to one exemplary embodiment of the present application includes a hard segment having a glass transition temperature of 25° C. or more, and a soft segment having a glass transition temperature of 10° C. or less.

As such, the "hard segment" refers to a region exhibiting relatively rigid physical properties in the block copolymer, and the term "soft segment" refers to a region exhibiting relatively soft physical properties in the block copolymer.

According to one exemplary embodiment, the glass transition temperature of the hard segment may be 25° C. or more, for example, may be in a range of 30° C. to 200° C., 50° C. to 100° C., or 55° C. to 90° C. Within this glass transition temperature range, the hard segment may be present in a vitreous phase, and exhibit rigid physical properties.

Also, the glass transition temperature of the soft segment may be 10° C. or less, for example, may be in a range of −80° C. to 10° C., −80° C. to 5° C., or −80° C. to 0° C. Within this glass transition temperature range, the soft segment may have molecular flowability at room temperature, thereby exhibiting soft physical properties.

In this specification, the term "room temperature" may refer to a naturall temperature which is not heated or cooled, for example, a temperature of approximately 10° C. to approximately 30° C., approximately 15° C. to approximately 30° C., approximately 20° C. to 30° C., approximately 25° C., or approximately 23° C.

According to one exemplary embodiment, a monomer forming the hard segment is not particularly limited as long as the monomer can provide the hard segment having a glass transition temperature of 25° C. or more. For example, the hard segment may include a polymerization unit derived from a methacrylic monomer.

The type of the methacrylic monomer is not particularly limited, and, may, for example, be an alkyl methacrylate containing an alkyl group having 1 to 18 carbon atoms, polyethylene glycol methacrylate, polyethylene glycol methacrylate alkyl ester, benzyl methacrylate, or the like.

According to one exemplary embodiment, when the alkyl group included in the alkyl methacrylate has an excessively long chain, it may be difficult to adjust the glass transition temperature (Tg) of the alkyl methacrylate. Therefore, an alkyl methacrylate containing an alkyl group having 1 to 14 carbon atoms, preferably 1 to 12 carbon atoms, may be preferably used. Such a monomer may include at least one selected from the group consisting of methyl methacrylate, ethyl methacrylate, n-butyl methacrylate, t-butyl methacrylate, sec-butyl methacrylate, pentyl methacrylate, 2-ethylhexyl methacrylate, 2-ethylbutyl methacrylate, n-octyl methacrylate, isooctyl methacrylate, isononyl methacrylate, lauryl methacrylate, cyclohexyl methacrylate, isobonyl methacrylate, adamantyl methacrylate, and tetradecyl methacrylate, which may be used alone or in combination of two or more.

A hard segment having a high glass transition temperature may also be formed using an aromatic monomer such as styrene. When the aromatic monomer is used, however, efficiency of a chain extension reaction is poorer than in the use of a methacrylate, resulting in poor efficiency of synthesis of the block copolymer. In the block copolymer according to one exemplary embodiment of present application, the above-described problems may be solved by forming a hard segment using a methacrylic monomer.

Also, the hard segment may be included in an amount of 5 to 25% by weight, for example, 5 to 15% by weight, 10 to 25% by weight, or 7 to 17% by weight, based on the total weight of the block copolymer.

According to one exemplary embodiment, the soft segment has a polymerization unit derived from a cross-linkable monomer containing a cross-linkable functional group.

The cross-linkable monomer is configured to inhibit complete separation of the hard segment at a high temperature by increasing a chemical cross-linking density around the hard segment without causing an increase in glass transition temperature of the hard segment. In this case, the cross-linkable monomer is included in a polymerized state in the soft segment.

FIG. 1 is a schematic diagram showing a block copolymer according to one exemplary embodiment of the present application. According to one exemplary embodiment, in the soft segment of the block copolymer, the polymerization unit derived from the cross-linkable monomer containing a cross-linkable functional group has a higher concentration in a region adjacent to the hard segment than in a region which is not adjacent to the hard segment, as shown in FIG. 1. Therefore, in the soft segment of the block copolymer, the cross-linkable functional group may be distributed at a larger amount in the region adjacent to the hard segment than in the region which is not adjacent to the hard segment. That is, in the soft segment of the block copolymer, the cross-linkable functional group is present at a higher density in the region adjacent to the hard segment than in the region which is not adjacent to the hard segment.

FIG. 2 is a schematic diagram showing a phase-separated structure including spherical domains occurring when a phase-separated film is formed using the block copolymer according to one exemplary embodiment of the present application.

As shown in FIG. 2, when a film is formed with the block copolymer according to one exemplary embodiment of the present application and cross-linked, a shell layer having a high cross-linking density which surrounds the hard segment is formed around the hard segment due to the above-described concentration distribution of the cross-linkable functional group in the soft segment. In this case, the shell layer may serve to prevent a situation in which spherical domains disappear as the hard segment is completely untangled even at a severe temperature condition higher than the glass transition temperature of the hard segment. Therefore, durability of a film may be further ensured at the severe temperature condition.

As such, in this specification, the term "concentration of a polymerization unit derived from a cross-linkable monomer" refers to the number of cross-linkable functional groups per 100 repeating units of an acrylic monomer in a polymer forming a soft segment, indicating that a larger amount of the cross-linkable functional groups are distributed as the concentration increases. According to one exemplary embodiment, in the region of the soft segment adjacent to the hard segment, the number of the linkable functional group per 100 repeating units of the acrylic monomer in the polymer may be in a range of 3 to 50, preferably 5 to 30, and, in the region of the soft segment which is not adjacent to the hard segment, the number of the cross-linkable functional groups per 100 repeating units of the acrylic monomer in the polymer may be in a range of 0.1 to 5, preferably 0.5 to 3.

In this specification, the terms "region adjacent to a hard segment" and "region which is not adjacent to the hard segment" also refer to a "region relatively closer to the hard segment in a soft segment" and a "region relatively remoter from the hard segment in the soft segment," respectively.

Also, the monomer forming the soft segment is not particularly limited as long as it is a monomer which can provide a soft segment having a glass transition temperature of 10° C. or less. For example, the soft segment may include polymerization units derived from an acrylic monomer and a cross-linkable monomer.

The type of the acrylic monomer is not particularly limited, and may, for example, include an alkyl acrylate containing an alkyl group having 1 to 18 carbon atoms, polyethylene glycol acrylate, polyethylene glycol acrylate alkyl ester, and the like.

According to one exemplary embodiment, in the case of the alkyl acrylate, it is desirable to use an alkyl acrylate containing an alkyl group having 1 to 14 carbon atoms, preferably 1 to 12 carbon atoms in an aspect of ease in controlling the glass transition temperature. Such an acrylic monomer may include at least one selected from the group consisting of methyl acrylate, ethyl acrylate, n-butyl acrylate, t-butyl acrylate, sec-butyl acrylate, pentyl acrylate, 2-ethylhexyl acrylate, 2-ethylbutyl acrylate, n-octyl acrylate, isooctyl acrylate, isononyl acrylate, lauryl acrylate, and tetradecyl acrylate, which may be used alone or in combination of two or more.

Also, the cross-linkable monomer may be a monomer containing at least one cross-linkable functional group selected from the group consisting of a hydroxyl group, a carboxyl group, an epoxy group, a glycidyl group, an isocyanate group, an amide group, an amino group, and an alkoxysilyl group.

A monomer containing a hydroxyl group, such as 2-hydroxyethyl (meth)acrylate, 2-hydroxypropyl (meth)acrylate, 4-hydroxybutyl (meth)acrylate, 6-hydroxyhexyl (meth)acrylate, hydroxyoctyl (meth)acrylate, hydroxyethylene glycol (meth)acrylate, glycerol (meth)acrylate, or hydroxypropylene glycol (meth)acrylate, may, for example, be used as the cross-linkable monomer containing the hydroxyl group. Also, a monomer including a combination of one or more may also be used herein, but the present application is not limited thereto. The carboxyl group-containing monomer that may be used herein may, for example, include (meth) acrylic acid, carboxyethyl (meth)acrylate, carboxypentyl (meth)acrylate, itconic acid, maleic acid, fumaric acid, crotonic acid, and the like, but the present application is not limited thereto. Also, the cross-linkable monomer containing a glycidyl group that may be used herein may, for example, include an epoxy alkyl (meth)acrylate such as glycidyl (meth)acrylate, or epoxycyclohexylmethyl (meth) acrylate, but the present application is not limited thereto. The cross-linkable monomer containing an isocyanate group that may be used herein may, for example, include 2-isocyanatoethyl (meth)acrylate, 1,1-bis(acryloyloxymethyl) ethyl isocyanate, (meth)acryloyloxy ethyl isocyanate, methisopropenyl-α,α-dimethylbenzylisocyanate, methacryloylisocyanate, or allyl isocyanate; an acryloyl monoisocyanate compound obtained by reacting a diisocyanate compound or a polyisocyanate compound with (meth) acrylic acid 2-hydroxyethyl; an acryloyl monoisocyanate compound obtained by reacting a diisocyanate compound or a polyisocyanate compound with a polyol compound, and (meth)acrylic acid 2-hydroxyethyl, and the like, but the present application is not limited thereto. The amide group-containing monomer that may be used herein may, for example, include (meth)acrylamide, N-vinylpyrrolidone, N,N-dimethyl (meth)acrylamide, N,N-diethyl (meth)acrylamide, N,N-dimethylaminopropyl (meth)acrylamide, N,N-dimethylaminopropyl (meth)acrylamide, diacetone (meth) acrylamide, and the like, but the present application is not limited thereto. Also, the amino group-containing monomer that may be used herein may, for example, include 2-aminoethyl (meth)acrylate, N,N-dimethylaminoethyl (meth)acrylate, N,N-dimethylaminopropyl(meth)acrylate, and the like, but the present application is not limited thereto. The alkoxysilyl group-containing monomer that may be used herein may include 3-(trimethoxysilyl)propyl (meth)acrylate, or 2-allyloxyethyl (meth)acrylate, but the present application is not limited thereto.

As such, the term "(meth)acrylate" refers to an acrylate or a methacrylate, and the other terms using the term "(meth)" are also as described above.

According to one exemplary embodiment, the number average molecular weight of the block copolymer according to one exemplary embodiment of the present application is not particularly limited, and may be in a range of 5,000 to 500,000, for example, 30,000 to 300,000, or 50,000 to 200,000. When the number average molecular weight of the block copolymer is less than 5,000, the phase separation may not easily occur due to a very small molecular weight, and cross-linking efficiency in a cross-linking process may be poor. Also, when the number average molecular weight of the block copolymer is greater than 500,000, it may be substantially hard to be prepar the block copolymer using a living free-radical polymerization method to be described later. When the block copolymer having a very high molecular weight is prepared into a solution, workability may be deteriorated due to high viscosity.

Also, the block copolymer may have a molecular weight distribution of greater than 1 and 3 or less, for example, a molecular weight distribution of 1.01 to 3, 1.05 to 2.8, preferably 1.1 to 2.0. When the molecular weight distribution of the block copolymer is greater than 3, the phase separation may not occur, or it may be difficult to realize a phase-separated structure in a desired shape.

In addition, the shape of the block copolymer is not particularly limited. For example, the block copolymer may be diblock copolymer of an A/B-type, triblock copolymer of an A/B/A-type or B/A/B-type, or a gradient block copolymer in which the boundaries between the respective blocks are not well-defined.

Another exemplary embodiment of the present application provides a method for preparing the above-described block copolymer.

According to one exemplary embodiment, the preparing method includes a first polymerization step and a second polymerization step.

The first polymerization step is a step of polymerizing a monomer providing a hard segment having a glass transition temperature of 25° C. or more. Here, the monomer providing the hard segment having a glass transition temperature of 25° C. or more may be the above-described methacrylic monomer.

The second polymerization step is a step of terminating the polymerization when a conversion rate of the monomer providing the hard segment having a glass transition temperature of 25° C. or more is greater than or equal to 60%, and putting a cross-linkable monomer and a monomer providing a soft segment having a glass transition temperature of 10° C. or less into a reactor to polymerize with each other.

In the second polymerization step, the monomer providing the soft segment having a glass transition temperature of 10° C. or less may be the above-described acrylic monomer. Here, the cross-linkable monomer is as described above, and thus a description thereof is omitted for clarity.

According to one exemplary embodiment, the second polymerization step may include (a) adding the acrylic monomer at 2 to 50% by weight based on the total weight of the acrylic monomer included in the block copolymer and the cross-linkable monomer at 60 to 100% by weight based on the total weight of the cross-linkable monomer included in the block copolymer and polymerizing the acrylic monomer and the cross-linkable monomer, and (b) further adding the acrylic monomer at 50 to 98% by weight based on the total weight of the acrylic monomer included in the block copolymer and the cross-linkable monomer at 0 to 40% by weight based on the total weight of the cross-linkable monomer included in the block copolymer when a conversion rate of the added monomers is in a range of 5 to 90% and polymerizing the acrylic monomer and the cross-linkable monomer. In this case, since the cross-linkable monomer is present at a relatively higher concentration at the early stage of a reaction in which a chain extension reaction is started and present at a relatively lower concentration after further addition of the monomer mixture, the deviation of concentration of the cross-linkable monomer naturally occurs in a longitudinal direction of a polymer chain.

According to still another exemplary embodiment, the second polymerization step may further include (c) adding the acrylic monomer and a methacrylic cross-linkable monomer at 2 to 100% by weight based on the total weight of the acrylic monomer included in the block copolymer and polymerizing the acrylic monomer and the methacrylic cross-linkable monomer, and (d) further adding the acrylic monomer at 0 to 98% by weight based on the total weight of the acrylic monomer included in the block copolymer when a conversion rate of the monomers added at step (c) is in a range of 5 to 90% and polymerizing the acrylic monomer. In step (c), an acrylic cross-linkable monomer may be optionally further added in an amount of 2 to 100% by weight. In this case, since the acrylic cross-linkable monomer is added at a higher speed than that of the acrylic cross-linkable monomer, a block copolymer in which the methacrylic cross-linkable monomer is distributed at a higher density around the hard segment may be prepared. In addition, since the methacrylic cross-linkable monomer is present at a relatively lower concentration when the acrylic monomer is further added in step (d), the deviation of concentration of the cross-linkable functional group further increases in a longitudinal direction of the polymer chain.

In the method for preparing, the polymerization may be performed according to various known polymerization methods in which the block copolymer can be prepared. In aspects of easy selection of reaction conditions and the diversity of selectable functional groups, the polymerization may be preferably performed using a living free-radical polymerization method.

The term "living free-radical polymerization method" refers to a living polymerization method in which the polymerization is performed in a state in which the end of an active polymer chain is present in a free radical form. In this case, the term refers to a polymerization method in which only an initiation reaction and a growth reaction are performed without substantially performing a transfer reaction and a termination reaction, unlike a free radical polymerization method.

In the living free-radical polymerization method, it is possible to establish a system in which radical active species can be rapidly and reversibly converted into more stable covalently bonded species (e.g., dormant species) in order to effectively control the transfer reaction and the termination reaction by side reactions caused by highly reactive radical active species.

Also, in the initiation reaction of the living free-radical polymerization method, radical active species may be formed using various methods. For example, the radical active species may be formed by external physical stimuli or chemical stimuli. Examples of a method of forming the radical active species by the chemical stimuli may include a nitroxide mediated radical polymerization (NMP) method using radicals which are activated by a reversible reaction when heat is applied to a polymerization initiator, TEMPO, an atom transfer radical polymerization (ATRP) method using radicals formed by reversible activation of carbon-halogen bonds of an initiator end by a transition metal, a reversible addition fragmentation chain transfer (RAFT) radical polymerization method in which growing radicals are formed using a method of reversibly transferring functional groups in the end of a polymer chain when the end of the polymer chain is under the attack of radicals, and the like.

Still another exemplary embodiment of the present application provides a curable resin composition including the above-described block copolymer. According to one exemplary embodiment, the resin composition may be a pressure-sensitive adhesive composition.

According to one exemplary embodiment, the resin composition may further include a cross-linking agent in addition to the block copolymer. The cross-linking agent may be further included to facilitate a cross-linking reaction between acryl polymers, and may serve to improve adhesion reliability by forming a cross-linking structure to maintain cohesiveness of a pressure-sensitive adhesive layer upon heating.

According to one exemplary embodiment, the cross-linking agent is not particularly limited, but various kinds of known cross-linking agents such as a monofunctional cross-linking agent or a multifunctional cross-linking agent may be properly used in consideration of cross-linkable functional groups included in the resin composition. For example, an isocyanate-based compound may be used as the cross-linking agent when the cross-linkable functional group in the block copolymer is a hydroxyl group, and a polyacid compound may be used when the cross-linkable functional group in the block copolymer is an epoxy group. In addition, at least one selected from the group consisting of an epoxy-based compound, an aziridine-based compound, and a metal chelate-based compound may be used as the cross-linking agent, but the present application is not limited thereto. Also, the isocyanate-based compound is not particularly limited. For example, the isocyanate-based compound that may be used herein may include at least one selected from the group consisting of toluene diisocyanate, xylene diisocyanate, diphenyl methane diisocyanate, hexamethylene diisocyanate, isophorone diisocyanate, tetramethylxylene diisocyanate, naphthalene diisocyanate triphenylmethane triisocyanate, methylenebis(4-phenylmethane) triisocyanate, and a reaction product thereof with a polyoly such as trimethylolpropane. For example, the epoxy-based compound that may be used herein may include at least one selected from the group consisting of ethylene glycol diglycidyl ether, polyethylene glycol diglycidyl ether, triglycidyl ether, glycerine diglycidyl ether, glycerine triglycidyl ether, 1,6-hexanediol diglycidyl ether, trimethylolpropane triglycidyl ether, diglycidylaniline, N,N,N',N'-tetraglycidyl ethylenediamine, and N,N,N',N'-tetraglycidyl-1,3-dimethylbenzene, but the present application is not limited thereto. Also, examples of the aziridine-based compound that may be used herein may include at least one selected from the group consisting of N,N'-toluene-2,4-bis(1-aziridinecarboxamide), N,N'-diphenyl methane-4,4'-bis(1-aziridinecarboxamide), triethylene melamine, bisisoprotaloyl-1-(2-methylaziridine), and tri-1-aziridinylphosphine oxide, but the present application is not limited thereto.

According to one exemplary embodiment, the cross-linking agent may be included in an amount of 0.01 parts by weight to 10 parts by weight, based on 100 parts by weight of the resin composition. For example, the cross-linking agent may be included in an amount of 0.1 parts by weight to 3 parts by weight, 1 part by weight to 7 parts by weight, 2 parts by weight to 5 parts by weight, or 0.01 parts by weight to 5 parts by weight in the resin composition, based on 100 parts by weight of the resin composition, but the present application is not limited thereto. Within this content range, cohesiveness and durability of the pressure-sensitive adhesive layer may be maintained excellently.

In addition to the above-described block copolymer, at least one additive selected from the group consisting of a tackifying resin, a silane-based coupling agent, an anti-static agent, a near-infrared absorbent, a UV stabilizing agent, an antioxidant, a toning agent, a reinforcing agent, a filler, an anti-foaming agent, a surfactant, a cross-linking catalyst, a leveling agent and a plasticizing agent may also be further included in the resin composition within a content range in which no influence is exerted on the effects of the present application.

For example, the resin composition according to one exemplary embodiment of the present application may further include a tackifying resin. In this case, the tackifying resin may allow the resin composition to exhibit pressure-sensitive adhesiveness. The type of the tackifying resin is not particularly limited. For example, the tackifying resin that may be used herein may include an epoxy resin, a hydrocarbon resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, a polymerized rosin resin, or a polymerized rosin ester resin, which may be used alone or in combination.

The tackifying resin may be included in an amount of 1 part by weight to 100 parts by weight, based on 100 parts by weight of the resin composition. When the content of the tackifying resin is 1 part by weight or more, an addition effect may be ensured. On the other hand, when the content of the tackifying resin is less than or equal to 100 parts by weight, an effect of improving compatibility and cohesiveness may be ensured.

Also, the resin composition may further include a silane-based coupling agent. For example, the silane-based coupling agent may include ethyltrimethoxysilane, β-(3,4 epoxycyclohexyl), γ-glycidoxypropyl triethoxysilane, γ-glycidoxypropyl trimethoxysilane, γ-glycidoxypropyl methyldiethoxysilane, γ-glycidoxypropyl triethoxysilane, 3-mercaptopropyl trimethoxysilane, vinyltrimethoxysilane, vinyltriethoxy silane, γ-methacryloxypropyl trimethoxysilane, γ-methacryloxypropyl trimethoxysilane, γ-methacryloxypropyl triethoxysilane, γ-aminopropyl trimethoxysilane, γ-aminopropyl triethoxysilane, 3-isocyanatopropyl triethoxysilane, γ-acetoacetatepropyl trimethoxysilane, γ-acetoacetatepropyl triethoxysilane, β-cyanoacetyl trimethoxysilane, β-cyanoacetyl triethoxysilane, or acetoxyaceto trimethoxysilane, which may be used alone or in combination. Particularly, a silane-based coupling agent containing an acetoacetate group or a β-cyanoacetyl group may be used, but the present application is not limited thereto.

The silane-based coupling agent may be included in an amount of 0.01 parts by weight to 5 parts by weight in the resin composition, based on 100 parts by weight of the resin composition. For example, the silane-based coupling agent may be included in an amount of 0.1 parts by weight to 3 parts by weight, 1 part by weight to 4 parts by weight, 2 parts by weight to 3 parts by weight, or 0.01 parts by weight to 1 part by weight in the resin composition, based on 100 parts by weight of the resin composition, but the present application is not limited thereto. When the content of the silane-based coupling agent is 0.01 parts by weight or more, an effect of enhancing pressure-sensitive adhesiveness may be ensured. On the other hand, when the content of the silane-based coupling agent is less than or equal to 5 parts by weight, there are no possibilities that durable reliability may be deteriorated.

Also, the resin composition may further include an antistatic agent. In this case, any compounds may be used as the antistatic agent as long as they can provide a pressure-sensitive adhesive with antistatic performance without exerting a negative effect on transparency, workability and durability of the pressure-sensitive adhesive since the compounds has excellent compatibility with other components, such as an acrylate-based copolymer, included in the composition.

The antistatic agent may be included in an amount of 0.01 parts by weight to 5 parts by weight, based on 100 parts by weight of the resin composition. For example, the antistatic agent may be included in an amount of 0.1 parts by weight to 3 parts by weight, 1 part by weight to 4 parts by weight, 2 parts by weight to 3 parts by weight, or 0.01 parts by weight to 2 parts by weight in the resin composition, based on 100 parts by weight of the resin composition, but the present application is not limited thereto. When the content of the antistatic agent is 0.01 parts by weight or more, a desired antistatic effect may be achieved. On the other hand, when the content of the antistatic agent is less than or equal to 5 parts by weight, there are no possibilities that durable reliability or transparency of the pressure-sensitive adhesive may be deteriorated due to excellent compatibility with other components.

Further, the resin composition may further include a cross-linking catalyst. Here, the cross-linking catalyst is not particularly limited as long as it is a catalyst that can adjust a curing rate. At least one selected from the group consisting of dibutyltin dilaurate, triethylamine, diethylenetriamine, bismuthcarboxylate and zirconium chelate may be used as the cross-linking catalyst.

The cross-linking catalyst may be included in an amount of 0.001 to 5 parts by weight, based on 100 parts by weight of the solid content of the resin composition.

Furthermore, the resin composition may further include a near-infrared absorbent and a UV stabilizing agent for photo-curing. Optionally, the resin composition may further include an additive for making up for physical properties such as an antioxidant, a toning agent, a reinforcing agent, a filler, an anti-foaming agent, a surfactant, or a plasticizing agent.

The resin composition may be widely used in technical fields requiring excellent durability. For example, the resin composition may be used as a pressure-sensitive adhesive for polarizing plates, a pressure-sensitive adhesive for protective films of various display devices, or a gap filling material for various display devices, but the present application is not limited thereto.

Still another exemplary embodiment of the present application provides a film formed of the curable resin composition and including a cured product of the resin composition, for example, a pressure-sensitive adhesive film.

The resin composition includes a block copolymer. Thus, when the resin composition is formed into a film, the film has a phase-separated structure.

According to one exemplary embodiment, the phase-separated structure includes spherical domains.

The spherical domains serve as physical cross-linking points in the film, and a phase-separated copolymer film having the physical cross-linking points may exhibit superior physical durability to conventional copolymer films. Therefore, The film having a phase-separated structure including the spherical domains, which is prepared from the above-described block copolymer, may exhibit higher physical durability than that of films which may be prepared from a random copolymer having the same molecular weight as the block copolymer, and may have desired physical durability even when the film is prepared from a copolymer having a relatively low molecular weight. Also, by using a polymer having a low molecular weight, viscosity may be easily adjusted during a preparing process, thereby causing a relative increase in concentration of a polymer solution. Because a high-concentration polymer solution is prepared, productivity may be improved, and a copolymer film prepared from the polymer solution may have excellent dimensional stability. Further, a drying process may be reduced upon film preparation, which makes it possible to form a film with an economic process.

Also, the film having a phase-separated structure according to one exemplary embodiment of the present application is a block copolymer film formed by both of chemical cross-linking and physical cross-linking. Therefore, the film has an advantage in that stress focused in a film or a substrate may be relieved due to softening of the hard segment at a high temperature, compared to a block copolymer film formed by chemical cross-linking. Accordingly, the film may be effectively applied to some applied fields requiring stress relaxation, that is, the use of an interlayer material in the film having a multilayer structure in which a thin substrate is used. For example, the film may be effectively applied to pressure-sensitive adhesive films for display devices to which a thin glass substrate is applied, or a gap filling materials.

Meanwhile, the hard segment of the block copolymer film exhibits a stress relaxation effect when softened at a temperature higher than the glass transition temperature, but durability may be deteriorated when the film is repeatedly exposed to a high-temperature condition. This is because two phases intermixed at a temperature higher than the glass transition temperature may be easily re-separated and the physical cross-linking points may be easily re-formed when there is no solvent, compared to the film preparation. Also, the glass transition temperature of the hard segment may not unlimitedly increase to improve durability at a high temperature. This is because advantages appearing when the solid content is maintained at a high concentration may be lost due to a further increase in viscosity of the polymer when the glass transition temperature of the hard segment is high.

However, the block copolymer film according to one exemplary embodiment of the present application may inhibit complete separation of the hard segment even at a severe temperature condition by increasing a chemical cross-linking density around the hard segment without causing an increase in the glass transition temperature of the hard segment. Therefore, the block copolymer film may exhibit stress relaxation characteristics, and simultaneously maintain high-temperature durability.

According to one exemplary embodiment, the pressure-sensitive adhesive film may, for example, be applied to a polarizing plate. For example, the present application is directed to an optical member including a base layer, and a pressure-sensitive adhesive film(s) formed on one or both surfaces of the base layer and including the resin composition.

The base layer may be a polarizer, a polarizing plate, a retardation plate, a viewing angle compensation film, or a brightness enhancement film. According to one exemplary embodiment, the base layer may be a polarizing plate.

The type of the polarizing film included in the polarizing plate is not particularly limited. For example, general types of polarizing films, such as a polyvinyl alcohol-based polarizing film, known in the related art may be used without limitation.

The polarizing film is a functional film that can extract light that oscillates in one direction from incident light that oscillates in all directions. Such a polarizing film may, for example, have a structure in which a dichroic pigment is adsorbed onto and aligned in a polyvinyl alcohol-based resin film. The polyvinyl alcohol-based resin constituting the polarizing film may, for example, be obtained by gelling a polyvinyl acetate-based resin. In this case, the polyvinyl acetate-based resin that may be used herein may include a copolymer of another monomer copolymerizable with vinyl acetate, as well as a monopolymer of vinyl acetate. As such, examples of the monomer copolymerizable with vinyl acetate may include unsaturated carboxylic acids, olefins, vinylethers, unsaturated sulfonic acids, and acrylamides containing an ammonium group, which may be used alone or in combination, but the present application is not limited thereto.

The polarizing film may be prepared by subjecting such a polyvinylalcohol-based resin film to a series of processes including a process of elongating such a polyvinyl alcohol-based resin film (for example, uniaxial elongation), a process of staining a polyvinyl alcohol-based resin film with a dichroic pigment and adsorbing the dichroic dye, a process of treating a polyvinyl alcohol-based resin film, which has the dichroic dye adsorbed thereto, with an aqueous boric acid solution, and a process of washing the film treated with the aqueous boric acid solution. As such, an iodine or dichroic organic dye may be used as the dichroic dye.

Also, the polarizing plate may further include a protective film(s) formed on one or both surfaces of the polarizing film. In this case, a pressure-sensitive adhesive film may be formed on at least one surface of the protective film. The type of the protective film is not particularly limited. For example, the protective film that may be used herein may include a cellulose-based film such as triacetyl cellulose (TAC); a polyester-based film such as a polycarbonate film or a poly(ethylene terephthalet) (PET); a polyethersulfone-based film; or a film having a single-layer structure or a structure in which at least two layers are stacked, such as a polyethylene film, a polypropylene film, or a polyolefin-based film prepared using an ethylene-propylene copolymer or a resin having a cyclo-based or norbornene structure.

Also, the polarizing plate may further include at least one functional layer selected from the group consisting of a protective layer, a reflective layer, an anti-glare layer, a retardation plate, a wide viewing angle compensation film, and a brightness enhancement film.

In the present application, a method of forming a pressure-sensitive adhesive film on such a polarizing plate is not particularly limited. For example, the pressure-sensitive adhesive film may be formed using a method of coating a base with the resin composition or a coating solution including the resin composition using a typical tool such as a comma coater or a bar coater and curing the resin composition or the coating solution, or a method of coating a surface of a peelable base with the resin composition, curing the resin composition and transferring the formed pressure-sensitive adhesive film.

Also, a method of curing the resin composition in such a process is not particularly limited. For example, the resin composition may be cured by subjecting the resin composition to a proper aging process so that the acryl polymer and the cross-linking agent included in the composition can be allowed to react with each other, or cured by irradiation with light which may induce a polymerization reaction of a photo-polymerizable compound, for example, irradiation with ultraviolet (UV) rays, and the like. According to one exemplary embodiment, the irradiation with UV rays may, for example, be performed using a tool such as a high-pressure mercury lamp, an electrodeless lamp, or a xenon lamp. Also, the illumination intensity of light upon UV-ray curing is not particularly limited as long as it is controlled to achieve sufficient curing without causing damage to general physical properties. For example, the illumination intensity is preferably in a range of 50 mW/cm$^2$ to 1,000 mW/cm$^2$, and the light intensity is preferably in a range of 50 mJ/cm$^2$ to 1,000 mJ/cm$^2$.

Also, the present application is directed to a liquid crystal display device attached to a liquid crystal panel by means of a pressure-sensitive adhesive film of the optical member. For example, the optical member may be a polarizing plate.

In the device, all types of known panels, for example, various passive matrix panels such as a twisted nematic (TN) panel, super-twisted nematic (STN) panel, ferroelectic (F) panel, and a polymer-dispersed (PD) panel; various active matrix panels such as a two-terminal panel and a three-terminal panel; an in-plane switching (IPS)-mode panel, and a vertical alignment (VA)-mode panel, may be used as the liquid crystal panel.

Also, the types of other components in the liquid crystal display device, for example, upper/lower substrates such as a color filter substrate or an array substrate, are not also particularly limited. For example, the components known in the related art may be used without limitation.

Advantageous Effect of the Invention

The block copolymer according to one exemplary embodiment of the present application can be useful in inhibiting complete separation of the hard segment even under a severe high-temperature condition by increasing the chemical cross-linking density around the hard segment without causing an increase in glass transition temperature of the hard segment, thereby maintaining high-temperature durability.

DETAILED DESCRIPTION OF EXEMPLARY EMBODIMENTS

Figure 1:
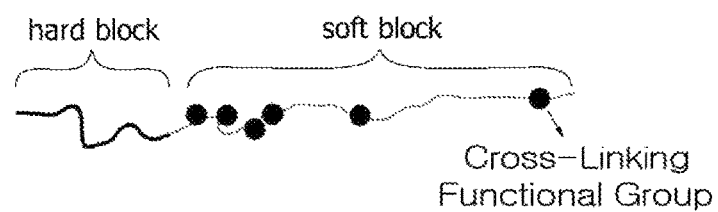
FIG. 1 is a schematic diagram showing a block copolymer according to one exemplary embodiment of the present application.
Figure 2:
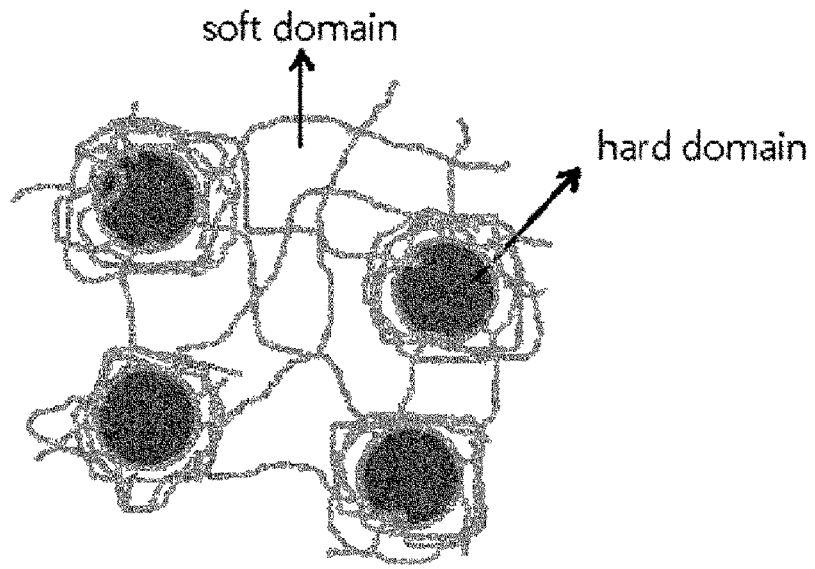
FIG. 2 is a schematic diagram showing a phase-separated structure including spherical domains occurring when a phase-separated film is formed using the block copolymer according to one exemplary embodiment of the present application.

Hereinafter, exemplary embodiments of the present application will be described in detail. However, the present application is not limited to the embodiments to be disclosed below, but can be implemented in various forms. The following embodiments are described in order to enable those of ordinary skill in the art to embody and practice the present application.

Preparation of Copolymer

Preparative Example 1

50 g of methyl methacrylate (MMA) and 50 g of n-butyl methacrylate (BMA) as monomers used to prepare a hard segment, 100 g of an ethyl acetate (EA) solvent, and 0.65 g of an ethyl 2-bromoisobutyrate (EBiB) ATRP initiator was added to a 500-mL round-bottom flask, and the flask was sealed. A reaction flask was bubbled with nitrogen for 30 minutes to remove oxygen, and dipped in an oil bath which is heated at 60° C. 0.24 g of CuBr was put into a separately arranged 10-mL vial to remove oxygen, and 0.44 g of N,N,N',N'',N''-pentamethyldiethylenetriamine (PMDETA) and 7 mL of oxygen-free N,N-dimethylformamide (DMF) were then added to prepare an ATRP catalyst solution. The catalyst solution prepared under a nitrogen atmosphere was put into the flask, and a reaction was initiated. The previously prepared flask was bubbled with nitrogen for 30 minutes to remove oxygen from the solution, and then heated at 60° C. in an oil bath. After 7 hours of heating, the flask was opened and exposed to oxygen, and a reaction was then terminated. As a result, a P(MMA-co-BMA) macroinitiator (MI1) having a monomer conversion rate of 72%, a number average molecular weight (Mn) of 26,000, a PDI (Mw/Mn) of 1.22, and a glass transition temperature of 55° C. was prepared. 30 g of MI1 purified by precipitation with methanol, 27 g of n-butyl acrylate (BA), 15 g of 4-hydroxybutyl acrylate (HBA), and 72 g of EA were put into a 1 L reactor, and bubbled with nitrogen for 30 minutes to remove oxygen. The reaction temperature was controlled to be 60° C. while maintaining a nitrogen atmosphere. A catalyst solution including 0.016 g of $CuBr_2$, 0.052 g of tris(2-pyridylmethyl)amine (TPMA), and 1.4 mL of DMF was prepared and put into a reactor, and 0.75 g of tin dioctoate was added as a catalyst reducing agent to initiate a reaction. The reaction conversion rate was measured using $^1$H-NMR, and, when the conversion rate of BA reached 30%, a mixture of 250 g of BA and 250 g of EA from which oxygen was previously removed was put into a reaction bath, and the temperature of the reaction bath was maintained at 60° C. After 15 hours, the reaction was terminated, and a P(MMA-co-BMA)-b-P(BA-co-HBA) copolymer solution in which cross-linking functional groups are unevenly distributed around a hard segment was prepared. In this case, it was revealed that the copolymer had a monomer conversion rate of 68%, a number average molecular weight (Mn) of 189,000, a PDI (Mw/Mn) of 1.31, and a P(MMA-co-BMA) content ($^1$H-NMR) of 14%.

Preparative Example 2

30 g of MI1 prepared in Preparative Example 1, 30 g of BA, 20 g of 2-hydroxypropyl methacrylate (HPMA), and 65 g of EA were put into a 1 L reactor, and bubbled with nitrogen for 30 minutes to remove oxygen. The reaction temperature was controlled to be 60° C. while maintaining a nitrogen atmosphere. A catalyst solution including 0.016 g of $CuBr_2$, 0.052 g of TPMA, and 1.4 mL of DMF was prepared and put into a reactor, and 0.75 g of tin dioctoate was added as a catalyst reducing agent to initiate a reaction. The reaction conversion rate was measured using $^1$H-NMR, and, when the conversion rate of BA reached 50%, a mixture of 250 g of BA and 250 g of EA from which oxygen was previously removed was put into a reaction bath, and the temperature of the reaction bath was maintained at 60° C. After 15 hours, the reaction was terminated, and a P(MMA-co-BMA)-b-P(BA-co-HPMA) copolymer solution in which cross-linking functional groups are unevenly distributed around a hard segment was prepared. In this case, it was revealed that the copolymer had a monomer conversion rate of 65%, a number average molecular weight (Mn) of 163,000, a PDI (Mw/Mn) of 1.34, and a P(MMA-co-BMA) content ($^1$H-NMR) of 13%.

Preparative Example 3

50 g of MMA, 84 g of cyclohexyl methacrylate (CHMA), 134 g of EA, 0.65 g of EBiB, 0.24 g of CuBr, and 0.44 g of PMDETA were added, and a P(MMA-co-CHMA) macroinitiator (MI2) (having a monomer conversion rate of 79%, an Mn of 33,000, a PDI (Mw/Mn) of 1.18, and a Tg of 91° C.) was prepared in the same manner as in Preparative Example 1. 30 g of MI2 purified by precipitation with methanol, 58 g of 2-ethylhexyl acrylate (EHA), 12 g of 4-hydroxybutyl acrylate (HBA), and 100 g of EA were put into a 1 L reactor, and bubbled with nitrogen for 30 minutes to remove oxygen. The reaction temperature was controlled to be 60° C. while maintaining a nitrogen atmosphere. A catalyst solution including 0.016 g of $CuBr_2$, 0.052 g of TPMA, and 1.4 mL of DMF was prepared and put into a reactor, and 0.75 g of tin dioctoate was added as a catalyst reducing agent to initiate a reaction. The reaction conversion rate was measured using $^1$H-NMR, and, when the conversion rate of BA reached 50%, a mixture of 250 g of BA and 250 g of EA from which oxygen was previously removed was put into a reaction bath, and the temperature of the reaction bath was maintained at 60° C. After 15 hours, the reaction was terminated, and a P(MMA-co-CHMA)-b-P(EHA-co-HBA) copolymer solution in which cross-linking functional groups are unevenly distributed around a hard segment was prepared. In this case, it was revealed that the copolymer had a monomer conversion rate of 75%, a number average molecular weight (Mn) of 260,000, a PDI (Mw/Mn) of 1.42, and a P(MMA-co-CHMA) content ($^1$H-NMR) of 11%.

Preparative Example 4

100 g of MMA, 100 g of EA, 0.65 g of EBiB, 0.24 g of CuBr, and 0.44 g of PMDETA were added, and a PMMA macroinitiator (MI3) (having a monomer conversion rate of 75%, an Mn of 25,500, a PDI (Mw/Mn) of 1.21, and a Tg of 105° C.) was prepared in the same manner as in Preparative Example 1. 30 g of MI3 purified by precipitation with methanol, 92 g of BA, 15 g of glycidyl methacrylate (GMA), and 107 g of EA were put into a 1 L reactor, and bubbled with nitrogen for 30 minutes to remove oxygen. The reaction temperature was controlled to be 60° C. while maintaining a nitrogen atmosphere. A catalyst solution including 0.016 g of $CuBr_2$, 0.052 g of TPMA, and 1.4 mL of DMF was prepared and put into a reactor, and 0.75 g of tin dioctoate was added as a catalyst reducing agent to initiate a reaction. The reaction conversion rate was measured using $^1$H-NMR, and, when the conversion rate of BA reached 30%, a mixture of 185 g of BA and 185 g of EA from which oxygen was previously removed was put into a reaction bath, and the temperature of the reaction bath was maintained at 60° C. At this point, the conversion rate of GMA was 67%. After 15 hours, the reaction was terminated, and a PMMA-b-P(BA-co-GMA) copolymer solution in which cross-linking functional groups are unevenly distributed around a hard segment was prepared. In this case, it was revealed that the copolymer had a monomer conversion rate of 72%, a number average molecular weight (Mn) of 194,000, a PDI (Mw/Mn) of 1.33, and a PMMA content ($^1$H-NMR) of 13%.

Preparative Example 5

30 g of MI3 prepared in Preparative Example 4, 92 g of BA, 15 g of N,N-dimethylaminoethyl methacrylate (DMAEA), 107 g of EA, 0.016 g of $CuBr_2$, 0.052 g of TPMA, and 0.75 g of tin dioctoate were added, and a reaction was performed in the same manner as in Preparative Example 4. When the conversion rates of BA and DMAEA reached approximately 30% and 65%, respectively, 185 g of BA and 185 g of EA were further added to prepare a PMMA-b-P(BA-co-DMAEA) copolymer solution (having a monomer conversion rate of 77%, an Mn of 182,000, a PDI (Mw/Mn) of 1.36, and a PMMA content ($^1$H-NMR) of 12%).

Comparative Preparative Example 1

30 g of MI1 prepared in Preparative Example 1, 277 g of BA, 15 g of HBA, and 292 g of EA were put into a 1 L reactor, and bubbled with nitrogen for 30 minutes to remove oxygen. The reaction temperature was controlled to be 60° C. while maintaining a nitrogen atmosphere. A catalyst solution including 0.016 g of $CuBr_2$, 0.052 g of TPMA, and 1.4 mL of DMF was prepared and put into a reactor, and 0.75 g of tin dioctoate was added as a catalyst reducing agent to initiate a reaction. After 15 hours, the reaction was terminated, and a P(MMA-co-BMA)-b-P(BA-co-HBA) copolymer solution in which cross-linking functional groups are uniformly distributed in a soft segment was prepared. In this case, it was revealed that the copolymer had a monomer conversion rate of 69%, a number average molecular weight (Mn) of 191,000, a PDI (Mw/Mn) of 1.31, and a P(MMA-co-BMA) content ($^1$H-NMR) of 14%.

Comparative Preparative Example 2

30 g of MI3 prepared in Preparative Example 4, 277 g of BA, 15 g of GMA, and 292 g of EA were put into a 1 L reactor, and bubbled with nitrogen for 30 minutes to remove oxygen. The reaction temperature was controlled to be 60° C. while maintaining a nitrogen atmosphere. A catalyst solution including 0.016 g of $CuBr_2$, 0.052 g of TPMA, and 1.4 mL of DMF was prepared and put into a reactor, and 0.75 g of tin dioctoate was added as a catalyst reducing agent to initiate a reaction. After 15 hours, the reaction was terminated, and a PMMA-b-P(BA-co-GMA) copolymer solution in which cross-linking functional groups are uniformly distributed in a soft segment was prepared. In this case, it was revealed that the copolymer had a monomer conversion rate of 69%, a number average molecular weight (Mn) of 191,000, a PDI (Mw/Mn) of 1.31, and a PMMA content ($^1$H-NMR) of 14%.

Comparative Preparative Example 3

A mixture of 15 g of MMA, 15 g of BMA, 190 g of BA, 10 g of HBA, and 292 g of EA was put into a 1 L reactor, and bubbled with nitrogen for 30 minutes to remove dissolved oxygen. The reaction temperature was controlled to be 70° C., and 0.18 g of a thermal polymerization initiator, 2,2'-azobisisobutyronitrile (AIBN), was added, and then reacted for 15 hours. Then, the reaction was terminated. As a result, a random copolymer solution was prepared. In this case, it was revealed that the random copolymer had a monomer conversion rate of 96%, a number average molecular weight (Mn) of 98,000, a PDI (Mw/Mn) of 5.82, and a PMMA content ($^1$H-NMR) of 13%.

Comparative Preparative Example 4

100 g of styrene (S), 100 g of EA, and 0.65 g of EBiB were put into a round-bottom flask, and the flask was sealed. A reaction flask was bubbled with nitrogen for 30 minutes to remove oxygen, and dipped in an oil bath which is heated at 60° C. 0.24 g of CuBr was put into a separately arranged 10-mL vial to remove oxygen, and 0.44 g of PMDETA and 7 mL of oxygen-free DMF were then added to prepare an ATRP catalyst solution. The catalyst solution prepared under a nitrogen atmosphere was put into the flask, and a reaction was initiated. The previously prepared flask was bubbled with nitrogen for 30 minutes to remove oxygen from the solution, and then heated at 60° C. in an oil bath. After 7 hours of heating, the flask was opened and exposed to oxygen, and a reaction was then terminated. As a result, a PS macroinitiator (MI4) having a monomer conversion rate of 70%, a number average molecular weight (Mn) of 23,800, a PDI (Mw/Mn) of 1.24, and a glass transition temperature of 100° C. was prepared. A reaction was performed in the same manner as in Preparative Example 4 to prepare a PS-b-P (BA-co-GMA) copolymer solution in which cross-linking functional groups are unevenly distributed around a hard segment, except that MI4 purified by precipitation with methanol was used instead of MI3. In this case, it was revealed that the copolymer had a monomer conversion rate of 77%, a number average molecular weight (Mn) of 134,000, a PDI (Mw/Mn) of 2.75, and a PS content ($^1$H-NMR) of 12%.

Preparation of Cross-Linkable Resin Composition and Phase-Separated Film

Example 1

10 g (based on the solid content) of the block copolymer prepared in Preparative Example 1, 0.2 g of toluene diisocyanate as a cross-linking agent, and 0.01 g of dibutyltin dilaurate as a curing accelerator, were added, and EA was then added as a solvent to prepare a solution having a solid content of 30%. A release-treated surface of a poly(ethylene terephthalate) (PET) film (thickness: 38 µm, MRF-38 commercially available from Mitsubishi Corporation) release-treated with a silicon compound was coated with the solution so that a coating layer could have a thickness after drying of approximately 25 µm, and dried at 130° C. for 30 minutes in a convection oven. Phase separation and cross-linking were simultaneously induced in a drying process. A surface of the test sample prepared thus was observed in a phase mode of an atomic force microscopy (AFM) to obtain an image. As a result, it could be seen that a spherical phase was formed properly.

Examples 2 and 3

Cross-linked phase-separated films in which a spherical phase was formed properly were prepared in the same manner as in Example 1, except that the block copolymers prepared in Preparative Examples 2 and 3 were used, respectively, instead of the block copolymer of Preparative Example 1 used in Example 1.

Examples 4 and 5

10 g (based on the solid content) of the block copolymer prepared in Preparative Example 4 or 5, 0.2 g of a succinic anhydride, and 0.03 g of 2-methylimidazole were added, and EA was then added as a solvent to prepare a solution having a solid content of 30%. A release-treated surface of a PET film (thickness: 38 μm, MRF-38 commercially available from Mitsubishi Corporation) release-treated with a silicon compound was coated with the solution so that a coating layer could have a thickness after drying of approximately 25 μm, and dried at 130° C. for 30 minutes in a convection oven. Phase separation and cross-linking were simultaneously induced in a drying process. As a result, a phase-separated film having a spherical phase formed therein was prepared.

Comparative Example 1

A composition solution having a solid content of 30% was prepared in the same manner as in Example 1, except that the block copolymer prepared in Comparative Preparative Example 1 was used. Thereafter, a phase-separated film was prepared using the solution in the same manner as in Example 1.

Comparative Example 2

A composition solution having a solid content of 30% was prepared in the same manner as in Example 4, except that the block copolymer prepared in Comparative Preparative Example 2 was used. Thereafter, a phase-separated film was prepared using the solution in the same manner as in Example 1.

Comparative Example 3

A composition solution having a solid content of 30% was prepared in the same manner as in Example 4, except that the random copolymer prepared in Comparative Preparative Example 3 was used. Thereafter, a film was prepared using the solution in the same manner as in Example 1. In this case, no fine phase was observed due to the use of the random copolymer resin.

Comparative Example 4

A composition solution having a solid content of 30% was prepared in the same manner as in Example 4, except that the block copolymer prepared in Comparative Preparative Example 4 was used. Thereafter, a film was prepared using the solution in the same manner as in Example 1. In this case, no spherical phase formation was observed since the copolymer had a relatively high molecular weight distribution value (Mw/Mn).

Evaluation of Durability Upon Application as Pressure-Sensitive Adhesive for Polarizing Plates
1. Preparation of Polarizing Plate Specimen A pressure-sensitive adhesive layers was formed between a glass substrate and a polarizing plate using the resin composition including each of the block copolymers and random copolymers prepared in Examples 1 and 2 and Comparative Examples 1 and 3. Each of the resin films prepared in Example 1 and Comparative Examples 1 and 3 was attached to the polarizing plate to prepare a polarizing plate specimen. The polarizing plate specimen was cut into pieces having a size of 180 cm×320 cm (length×width), and attached to a commercially available LCD panel having a thickness of 0.7 mm. Thereafter, the panel was stored at 50° C. and 5 atmospheric pressures for 20 minutes to prepare a sample polarizing plate.

2. Evaluation of Heat-Resistant Durability

To evaluate heat-resistant durability of the sample polarizing plate prepared thus, the prepared sample polarizing plate was kept for approximately 300 hours under a temperature condition of 90° C., and formation of bubbles on a surface of a pressure-sensitive adhesive and peeling of the pressure-sensitive adhesive were observed with the naked eye. The heat-resistant durability was evaluated according to the following evaluation criteria.

<Criteria for Evaluation of Heat-Resistant Durability>
○: There are no bubble formation and peeling
Δ: Bubble formation and peeling are slightly observed
x: Bubble formation and peeling are slightly observed in larger numbers The durability evaluation results are listed in the following Table 1.

TABLE 1

| | Type of polymer | Tg of hard segment | Durability |
| --- | --- | --- | --- |
| Example 1 | Block polymer | 55° C. | ○ |
| Example 2 | Block polymer | 55° C. | ○ |
| Comparative Example 1 | Block polymer | 55° C. | x |
| Comparative Example 3 | Random polymer | — | x |

Evaluation of Durability Upon Application as a Pressure-Sensitive Adhesive for Attaching Hard Coating Layer-Protective Film Used During ITO Glass Annealing Each of the compositions including the block copolymers prepared in Examples 3, 4 and 5 and Comparative Examples 2 and 4 was applied to a pressure-sensitive adhesive for attaching a film used to protect a hard coating layer of ITO glass. Each of the films prepared using the resin compositions prepared in Examples 3, 4 and 5 and Comparative Examples 2 and 4 was attached to a hard coating layer opposite to the hard coating layer of ITO glass, and subjected to ITO annealing at 150° C. for an hour.

The criteria for evaluation of durability were applied in the same manner as in the pressure-sensitive adhesive for polarizing plates. The durability evaluation results are listed in the following Table 2.

TABLE 2

| | Type of polymer | Tg of hard segment | Durability |
| --- | --- | --- | --- |
| Example 3 | Block polymer | 91° C. | ○ |
| Example 4 | Block polymer | 105° C. | ○ |
| Example 5 | Block polymer | 105° C. | ○ |
| Comparative Example 2 | Block polymer | 105° C. | x |
| Comparative Example 4 | Block polymer | 100° C. | x |

As listed in Table 2, it was revealed that the block copolymer according to one exemplary embodiment of the present application maintained excellent durability and exhibited higher durability than the random copolymer due to the presence of the physical cross-linking points since the hard segment was not completely dismantled even at a severe temperature condition higher than the glass transition temperature of the hard segment.

What is claimed is:

1. A cured product of a curable resin composition, wherein the curable resin composition comprises a block copolymer comprising:
    a hard segment having a glass transition temperature of 25° C. or more; and
    a soft segment having a glass transition temperature of 10° C. or less,
    wherein the soft segment comprises a polymerization unit derived from a cross-linkable monomer, and
    the polymerization unit derived from the cross-linkable monomer has a higher concentration in a region adjacent to the hard segment than in a region which is not adjacent to the hard segment,
    wherein the cured product of the curable resin composition has a phase-separated structure comprising a shell layer and a spherical domain, wherein the shell layer comprises the soft-segment, and the spherical domain comprises the hard segment, and the shell layer has a higher cross-linking density in a region adjacent to the hard segment than in a region which is not adjacent to the hard segment.

2. The cured product of claim 1, wherein the hard segment comprises a polymerization unit derived from a methacrylic monomer.

3. The cured product of claim 1, wherein the soft segment comprises polymerization units derived from an acrylic monomer and a cross-linkable monomer.

4. The cured product of claim 1, wherein the glass transition temperature of the hard segment is in a range of 30° C. to 200° C.

5. The cured product of claim 1, wherein the glass transition temperature of the soft segment is in a range of −80° C. to 0° C.

6. The cured product of claim 1, wherein the cross-linkable monomer comprises at least one functional group selected from the group consisting of a hydroxyl group, a carboxyl group, an epoxy group, a glycidyl group, an isocyanate group, an amide group, an amino group, and an alkoxysilyl group.

7. The cured product of claim 1, wherein the content of the hard segment is in a range of 5 to 25% by weight, based on the total weight of the block copolymer.

8. The cured product of claim 1, which has a number average molecular weight of 5,000 to 500,000.

9. The cured product of claim 1, which has a molecular weight distribution of greater than 1 and 3 or less.

10. A film comprising the cured product of claim 1.

11. The film of claim 10, wherein the film is a pressure-sensitive adhesive film.

* * * * *